United States Patent
Huang et al.

(10) Patent No.: US 10,264,282 B2
(45) Date of Patent: Apr. 16, 2019

(54) METHOD AND APPARATUS OF INTER CODING FOR VR VIDEO USING VIRTUAL REFERENCE FRAMES

(71) Applicant: MEDIATEK INC., Hsin-Chu (TW)

(72) Inventors: Chao-Chih Huang, Zhubei (TW); Hung-Chih Lin, Nantou County (TW); Jian-Liang Lin, Yilan County (TW); Chia-Ying Li, Taipei (TW); Shen-Kai Chang, Zhubei (TW)

(73) Assignee: MEDIATEK INC., Hsin-Chu (TW)

( * ) Notice: Subject to any disclaimer, the term of this patent is extended or adjusted under 35 U.S.C. 154(b) by 113 days.

(21) Appl. No.: 15/629,855

(22) Filed: Jun. 22, 2017

(65) Prior Publication Data

US 2017/0374385 A1    Dec. 28, 2017

Related U.S. Application Data

(60) Provisional application No. 62/354,856, filed on Jun. 27, 2016.

(51) Int. Cl.
*H04N 19/105* (2014.01)
*H04N 19/167* (2014.01)
*H04N 19/176* (2014.01)
*H04N 19/597* (2014.01)

(52) U.S. Cl.
CPC ......... *H04N 19/597* (2014.11); *H04N 19/105* (2014.11); *H04N 19/167* (2014.11); *H04N 19/176* (2014.11)

(58) Field of Classification Search
CPC .. H04N 19/105; H04N 19/167; H04N 19/176; H04N 19/597
See application file for complete search history.

(56) References Cited

U.S. PATENT DOCUMENTS

2014/0218354 A1    8/2014    Park et al.
2016/0142697 A1*   5/2016    Budagavi ............. H04N 19/117
                                                           348/43

FOREIGN PATENT DOCUMENTS

| CN | 102685532 A | 9/2012 |
| CN | 105554506 A | 5/2016 |
| CN | 105681805 A | 6/2016 |

* cited by examiner

*Primary Examiner* — Anner N Holder
(74) *Attorney, Agent, or Firm* — McClure, Qualey & Rodack, LLP

(57) ABSTRACT

A method and apparatus of video encoding or decoding for a video encoding or decoding system applied to multi-face sequences corresponding to a 360-degree virtual reality sequence are disclosed. According the present invention, one or more multi-face sequences representing the 360-degree virtual reality sequence are derived. If Inter prediction is selected for a current block in a current face, one virtual reference frame is derived for each face of said one or more multi-face sequences by assigning one target reference face to a center of said one virtual reference frame and connecting neighboring faces of said one target reference face to said one target reference face at boundaries of said one target reference face. Then, the current block in the current face is encoded or decoded using a current virtual reference frame derived for the current face to derive an Inter predictor for the current block.

19 Claims, 14 Drawing Sheets

METHOD AND APPARATUS OF INTER CODING FOR VR VIDEO USING VIRTUAL REFERENCE FRAMES

CROSS REFERENCE TO RELATED APPLICATIONS

The present invention claims priority to U.S. Provisional Patent Application, Ser. No. 62/354,856, filed on Jun. 27, 2016. The U.S. Provisional Patent Application is hereby incorporated by reference in its entirety.

FIELD OF THE INVENTION

The present invention relates to image and video coding. In particular, the present invention relates to generation and usage of inter coding reference for polyhedral mapped 360-degree virtual reality (VR) video.

BACKGROUND AND RELATED ART

The 360-degree video, also known as immersive video is an emerging technology, which can provide "feeling as sensation of present". The sense of immersion is achieved by surrounding a user with wrap-around scene covering a panoramic view, in particular, 360-degree field of view. The "feeling as sensation of present" can be further improved by stereographic rendering. Accordingly, the panoramic video is being widely used in Virtual Reality (VR) applications.

Immersive video involves the capturing a scene using multiple cameras to cover a panoramic view, such as 360-degree field of view. The immersive camera usually uses a set of cameras, arranged to capture 360-degree field of view. Typically, two or more cameras are used for the immersive camera. All videos must be taken simultaneously and separate fragments (also called separate perspectives) of the scene are recorded. Furthermore, the set of cameras are often arranged to capture views horizontally, while other arrangements of the cameras are possible, The 360-degree panorama camera captures scenes all around and the stitched spherical image is one way to represent the VR video, which continuous in the horizontal direction. In other words, the contents of the spherical image at the left end continue to the right end. The spherical image can also be projected to the six faces of a cube as an alternative 360-degree format. The conversion can be performed by projection conversion to derive the six-face images representing the six faces of a cube. On the faces of the cube, these six images are connected at the boundaries of the cube. In FIG. 1, image 100 corresponds to an unfolded cubic image with blank areas filled by dummy data. The unfolded cubic frame which is also referred as a cubic net with blank areas. As shown in FIG. 1, the unfolded cubic-face images with blank areas are fitted into a smallest rectangular that covers the six unfolded cubic-face images.

These six cube faces are interconnected in a certain fashion as shown in FIG. 1 since these six cubic faces correspond to six pictures on the six surfaces of a cubic. Accordingly, each boundary on the cube is shared by two cubic faces. In other words, each four faces in the x, y and z directions are continuous circularly in a respective direction. The circular boundaries for the cubic-face assembled frame with blank areas (i.e. image 100 in FIG. 1) are illustrated by image 200 in FIG. 2. The cubic boundaries associated with the cubic face boundaries are labelled, The cubic face boundaries with the same boundary number indicate that the two cubic face boundaries are connected and share the same cubic edge. For example, boundary #2 is on the top of face 2 and on the right side of face 4. Therefore, the top of face 2 is connected to the right side of face 4. Accordingly, the contents on the top of face 2 flow continuously into the right side of face 4 when face 2 is rotated 90 degrees counterclockwise.

While FIG. 1 and FIG. 2 illustrate an example of unfolded cubic net and cubic boundary connectivity for a cubic face representation of 360-degree virtual reality (VR) video, there also exist other multi-face representations of 360-degree VR video. The multiple face representation can be separated into multiple faces or a multi-face frame. Each sequence associated with one face can be coded separately. Alternatively, the frame sequence can be coded as a video sequence, where each frame corresponds to one unfolded multi-face frame or one assembled frame from the multiple faces. In the present invention, generation and usage of Inter coding references are disclosed.

BRIEF SUMMARY OF THE INVENTION

A method and apparatus of video encoding or decoding for a video encoding or decoding system applied to multi-face sequences corresponding to a 360-degree virtual reality sequence are disclosed. According to embodiments of the present invention, one or more multi-face sequences representing the 360-degree virtual reality sequence are derived. If Inter prediction is selected for a current block in a current face of said one or more multi-face sequences, one virtual reference frame is derived for each face of said one or more multi-face sequences by assigning one target reference face to a center of said one virtual reference frame and connecting neighboring faces of said one target reference face to said one target reference face at boundaries of said one target reference face. Then, the current block in the current face is encoded or decoded using a current virtual reference frame derived for the current face to derive an Inter predictor for the current block.

The one or more multi-face sequences may correspond to N individual face sequences and each face sequence is individually encoded or decoded, and wherein N is an integer corresponding to a total number of faces in a polyhedron representing the 360-degree virtual reality sequence. The one or more multi-face sequences may also correspond to one frame sequence, and wherein each frame comprises all faces of a polyhedron having a same time index.

Various ways to the virtual reference frame are disclosed. In one embodiment, a fixed-viewport virtual reference frame is disclosed, where the target reference face assigned to the center of the virtual reference frame for the current face corresponds to a reference face having the same face number as the current face without any rotation. In another embodiment, a changed-viewport virtual reference frame is disclosed, where the target reference face assigned to the center of said one virtual reference frame for the current face corresponds to a reference face having a different face number from the current face. Furthermore, the reference face having the different face number from the current face can be rotated by an angle. The face identification information associated with the reference face, angle information associated with the angle rotated, or both can be signaled at an encoder side or parsed at a decoder side.

In yet another embodiment of generating the virtual reference frame, an arbitrary-viewport virtual reference frame is disclosed, where the target reference face assigned to the center of said one virtual reference frame for the current face corresponds to a reference face derived by rotating an original target reference face from an original viewport in one or more of three orthogonal axes of an associated equirectangular. An example of detailed arbitrary-viewport process is shown as follows: the original target reference face at the center of an original virtual reference frame is transformed to a corresponding reference face picture in the associated equirectangular; the corresponding reference face picture is then changed to a new corresponding reference face picture with a new viewport by rotating from the original viewport in said one or more of three orthogonal axes of the associated equirectangular; the new corresponding reference face picture in the associated equirectangular is transformed to a new target reference face in a multi-face frame; and the new target reference face is used as said one target reference face. The rotation information can be signaled in a video bitstream an encoder side or parsed from the video bitstream at a decoder side. The rotation information may also be derived implicitly from one or more motion vectors of the current block or one or more previously-coded temporal or spatial neighboring blocks.

The virtual reference frame construction process may further comprise padding one or more empty regions if the virtual reference frame contains any empty region after assigning the target reference face to the center of said one virtual reference frame and connecting neighboring faces of the target reference face to the target reference face at boundaries of the target reference face. For example, if a target empty region is outside a face boundary and an existing adjacent face is able to be placed into said target empty region without ambiguity, then the target empty region is padded using the existing adjacent face. In another case, if the target empty region has no corresponding adjacent face, the target empty region is padded using padding data derived from other faces.

If the current face is non-rectangular, a smallest rectangular enclosing the current face is used for encoding or decoding the current face. The smallest rectangular is adjusted to be divisible into an integer number of processing blocks for encoding or decoding. If a target processing block contains no pixels belonging to the current face, the target processing block is coded as a Skip mode. At the decoder side, all pixels outside the current face are set to zero or disregarded.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

For 360 VR representation or rendering, a spherical image is often mapped to a polyhedron. The faces of the polyhedron can be encoded separately. Alternatively, the faces of the polyhedron can be unfolded or assembled into a frame.

The conversion from the faces of the polyhedron into an unfolded frame or an assembled frame is also called polyhedral expansion. The encoding of the frames of polyhedral expansion suffers some problems. For example, the temporal reference is not uniformly applied among all faces due to the reason described as follows. During unfolding a polyhedron and assembling it to a frame, some faces are unavoidably rotated or connected to one or more other faces that are not originally connected to each other in the polyhedron. Furthermore, since mapping a spherical image to a polyhedron may introduce distortion and the distortion is not uniform through the whole image, the traditional block matching technique to determine the motion needs to be extended to more sophisticated motion model such as the affine transform to match the current and reference block. Also, the non-existing-face regions need to be padded. Accordingly, the present invention discloses techniques related to Inter coding references such as generation and usage of the Inter coding references.

Figure 1:
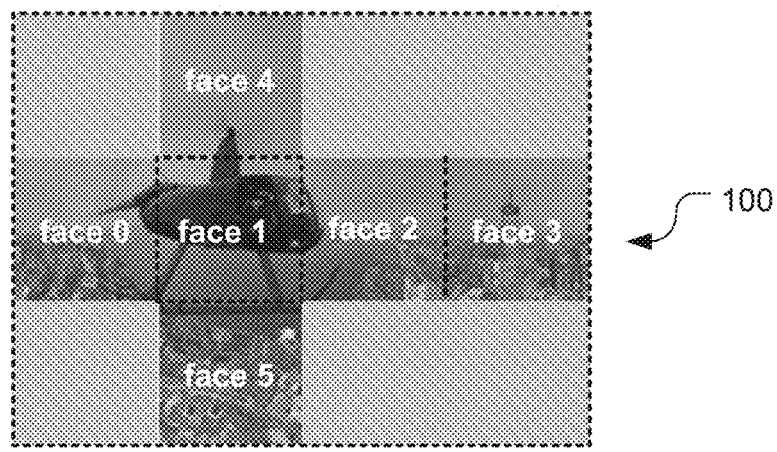
FIG. 1 illustrates an example of an unfolded cubic frame corresponding to a cubic net with blank areas filled by dummy data.
Figure 2:
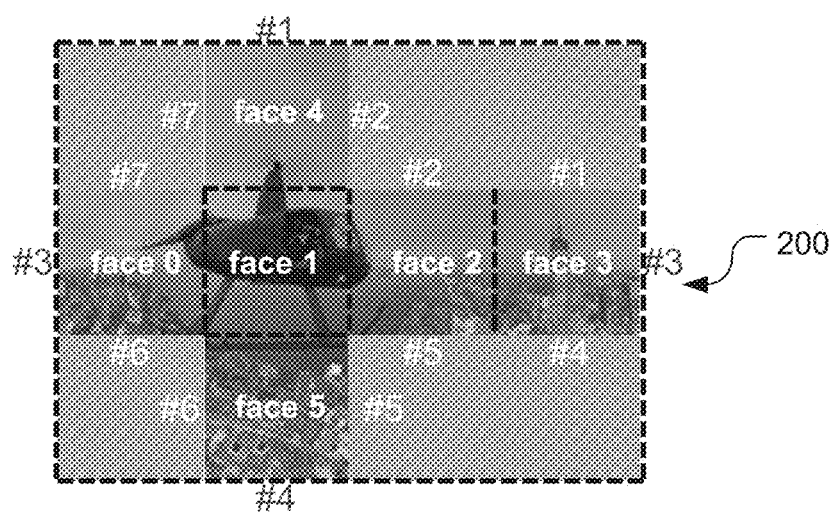
FIG. 2 illustrates an example of the circular boundaries for the cubic-face assembled frame with blank areas in FIG. 1.
Figure 3:
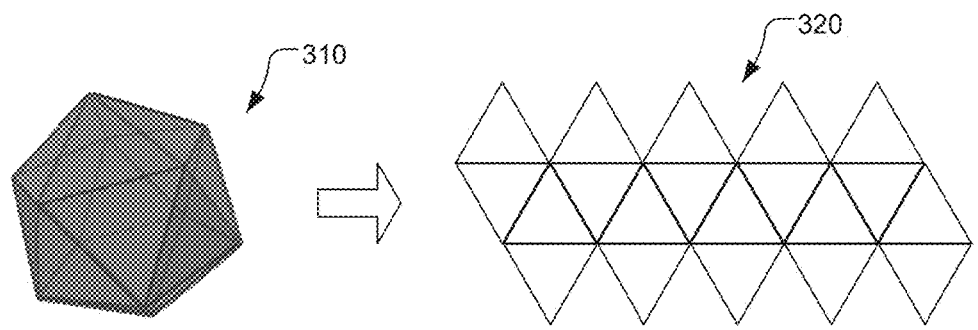
FIG. 3 illustrates an example of a regular polyhedron with 20 faces (i.e., Icosahedron), where each face has a triangular shape.
Figure 4:
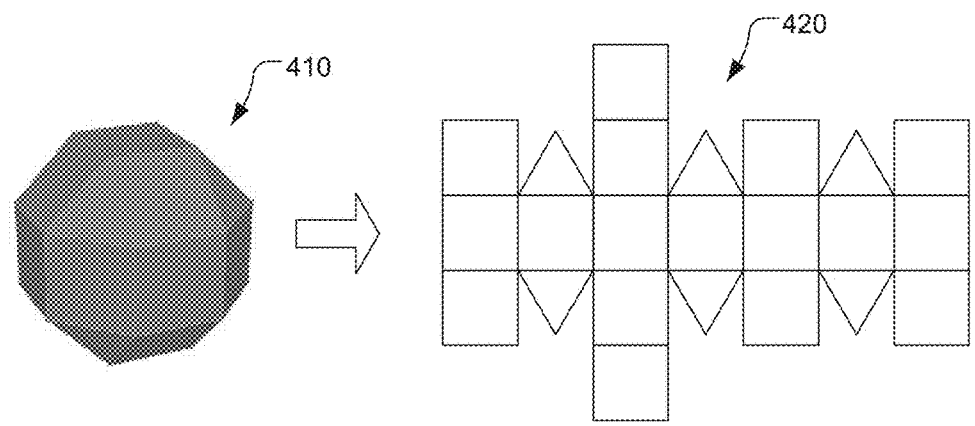
FIG. 4 illustrates an example of a non-regular polyhedron corresponding to a rhombicuboctahedron, which consists of triangles and rectangles.

As mentioned earlier, there also exist other multi-face representations of 360-degree VR beside the cubic faces. For example, the multi-face representation may correspond to a regular polyhedron, where all faces have the same shape and size, such as rectangular, triangular, hexagonal, etc. FIG. 3 illustrates an example of a regular polyhedron 310 with 20 faces, where each face has a triangular shape. The polyhedron 310 with 20 faces (i.e., Icosahedron) can be unfolded into a connected faces 320 (also called a frame). The multi-face representation may also correspond to a non-regular polyhedron, where the faces have two or more different polygon shapes. FIG. 4 illustrates an example of a rhombicuboctahedron 410, which consists of triangles and rectangles. The rhombicuboctahedron 410 can be unfolded into a connected faces 420 (also called a frame).

Figure 5:
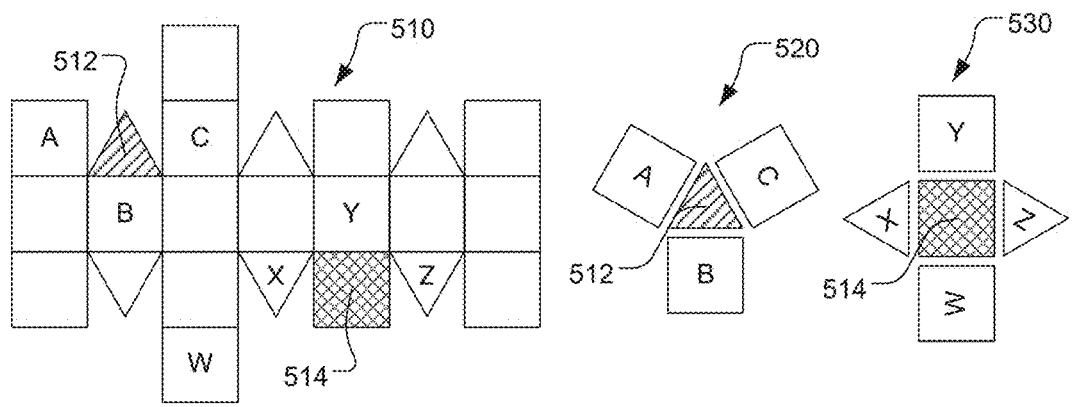
FIG. 5 illustrates an example of re-organizing the unfolded frame by centering the target faces, where two faces are selected as the target reference faces and adjacent faces are connected on all sides of each target reference face.

FIG. 3 and FIG. 4 illustrate examples of expanding a polyhedron into a frame by cutting some boundaries to separate the faces. In other words, a polyhedron can be unfolded to a frame. However, any side of a target face in a polyhedron is originally connected to another face. Therefore, an unfolded frame can always be re-organized by placing the target face at the center. The adjacent faces can all be connected with respective sides. FIG. 5 illustrates an example of re-organizing the unfolded frame 510 by centering the target faces 512 and 514. In re-organized frame 520, the three adjacent square faces A, B and C are connected to three sides of target face 512. In re-organized frame 530, the two adjacent square faces (Y and W) and two adjacent triangles (X and Z) are connected to four sides of target face 514. With the adjacent face connected, the boundary data outside the boundaries of the target become more available.

The present invention discloses a method of Inter coding for VR video using virtual reference frames. Various methods to construct virtual reference for inter coding of 360VR are described. For each face to be coded (i.e., the target face), the centered face, $f_{center}$ is determined. The centered face, $f_{center}$ is then pasted from reference frame at the center of virtual reference. The adjacent faces from the reference frame are connected to the boundaries of $f_{center}$. If there is any empty region such as a non-existing-face region, the non-existing-face region is padded.

Figure 6:
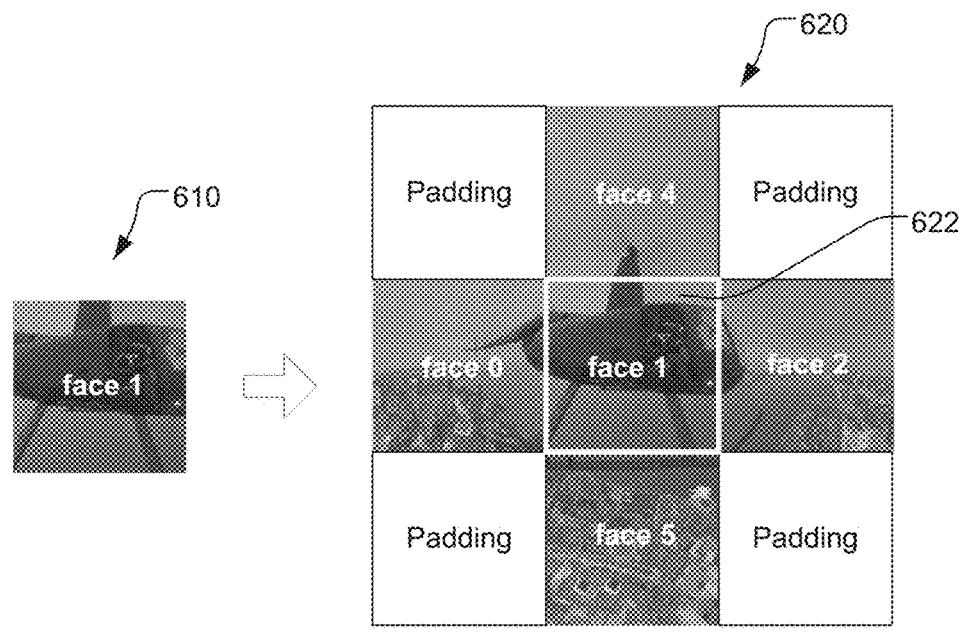
FIG. 6 illustrates an example of reconstructing a virtual reference for a cubic face according to an embodiment of the present invention.

FIG. 6 illustrates an example of reconstructing a virtual reference for a cubic face according to an embodiment of the present invention. Cubic face 610 (i.e., face 1) corresponds to target face to be coded. The corresponding face from the reference frame is pasted to at the center (622) of virtual reference 620. The adjacent faces (i.e., faces 0, 2, 4 and 5) from the reference frame are connected to the boundaries of the target face. As shown in FIG. 6, the four corner regions have no face existing. Accordingly, these non-existing-face regions are padded.

Figure 7:
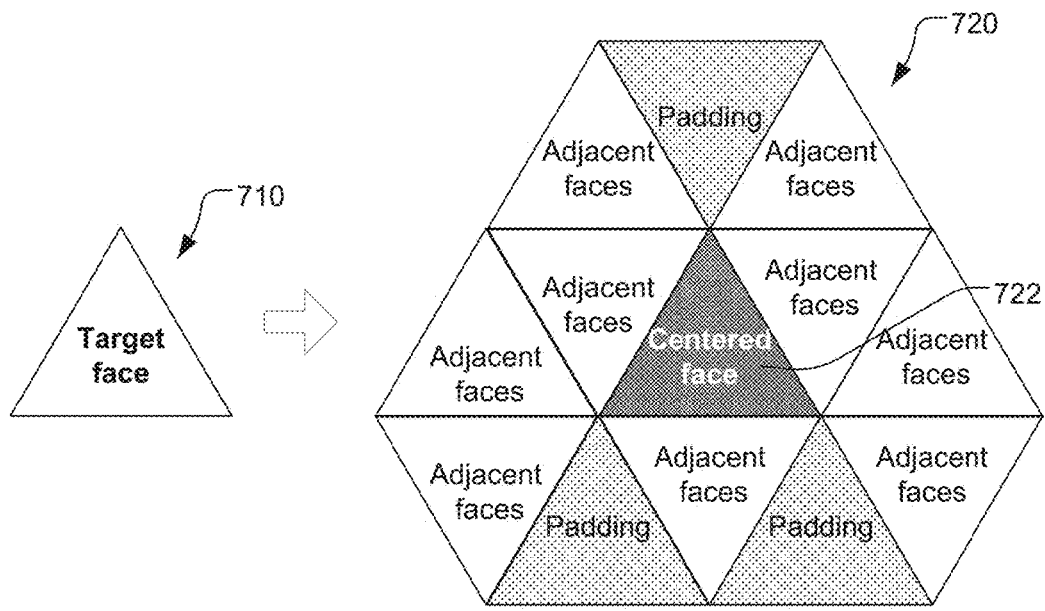
FIG. 7 illustrates an example of reconstructing a virtual reference for an icosahedron face according to another embodiment of the present invention.

FIG. 7 illustrates an example of reconstructing a virtual reference for an icosahedron face according to another embodiment of the present invention. Icosahedron face 710 corresponds to target face to be coded. The corresponding face from the reference frame is pasted to at the center (722) of virtual reference 720. The adjacent faces that share a common boundary or vertex of the target face, from the reference frame are connected to the boundaries or the vertexes of the target face. As shown in FIG. 7, there are 9 adjacent faces connected to the target face. After the adjacent faces are connected, three regions have no existing face to insert. Accordingly, these non-existing-face regions are padded.

While FIG. 6 and FIG. 7 illustrate two examples of virtual reference frame construction, the present invention also discloses two other techniques for virtual reference frame construction. The examples in FIG. 6 and FIG. 7 correspond to fixed-viewport virtual reference frame, where virtual reference frame is centered with the same target face in the reference frame. In this case, no face rotation is performed. In addition to the fixed-viewport virtual reference frame, the present invention also discloses changed-viewport virtual reference frame and arbitrary-viewport virtual reference. For the changed-viewport virtual reference frame, a face other than the target face can be assigned to the center of the reference frame. Furthermore, a rotation angle of the face can be assigned. For example, in the case of cubic faces, the rotation angle can be 0, 90, 180 or 270 degrees. The ID (identification) of the assigned center face and the rotation angle can be signaled in the video bitstream.

Figure 8:
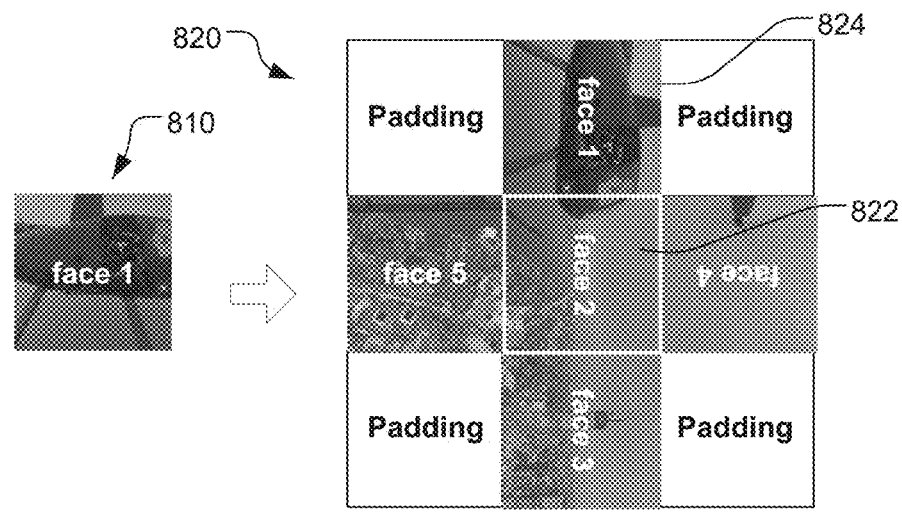
FIG. 8 illustrates an example of changed-viewport virtual reference frame for cubic faces.

FIG. 8 illustrates an example of changed-viewport virtual reference frame for cubic faces. In this example, the target face corresponds to face 1 (810). However, face 2 (822) of the reference frame is placed at the center of the virtual reference frame 820. In addition, the centered face is rotated clockwise by 90 degrees. The rotated face 1 of the reference frame is place at a non-center location 824 in this example. The texts associated with the faces are rotated along with the rotation of the faces. Information related to the new viewport description is signaled in the video bitstream. For example, the assigned center face ID and the rotation angle can be signaled so that a decoder can construct the same virtual reference frame at the decoder side.

The present invention also discloses arbitrary-viewport virtual reference frame construction. According to this method, the new viewport can be arbitrarily defined in the equirectangular domain, with view offset and rotation. A 3D object can be rotated about three orthogonal axes, such as x-, y- and z-axes of the equirectangular. Given $\phi_x$, $\phi_y$ and $\phi_z$ as the offsets used to rotate x-, y- and z-axes of the equirectangular, the offsets (i.e., $\phi_x$, $\phi_y$ and $\phi_z$) can be explicitly transmitted in the video bitstream. The offsets can also be derived from the transmitted motion vector (MV) of the current coding block or one or more previous coded blocks in any current part of the current frame, such as picture/slice/tile/view. The offsets can also be implicitly derived from the MV or MVs of the collocated blocks, the spatial neighboring blocks or the temporal blocks. Also, the offsets can be implicitly derived from the global MV of current view, face, or slice/picture or derived from previous coded view, face, or slice/picture.

Figure 9A:
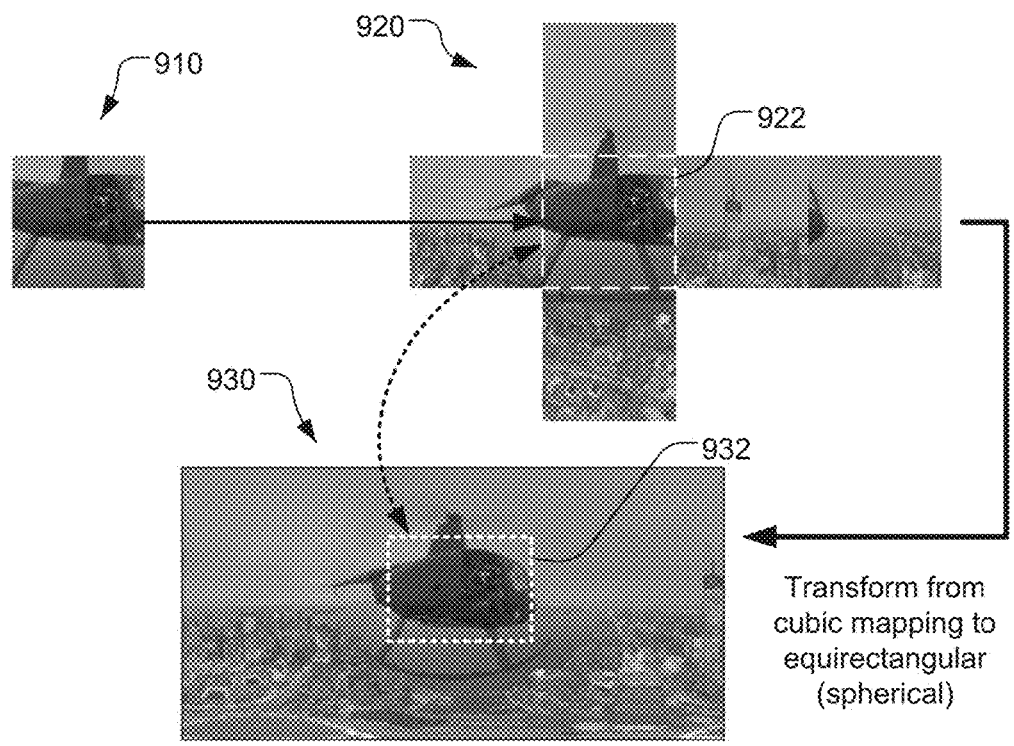
FIGS. 9A-C illustrate an example of various steps involved in arbitrary-viewport virtual reference construction for a cubic face via the equirectangular domain.
Figure 9B:
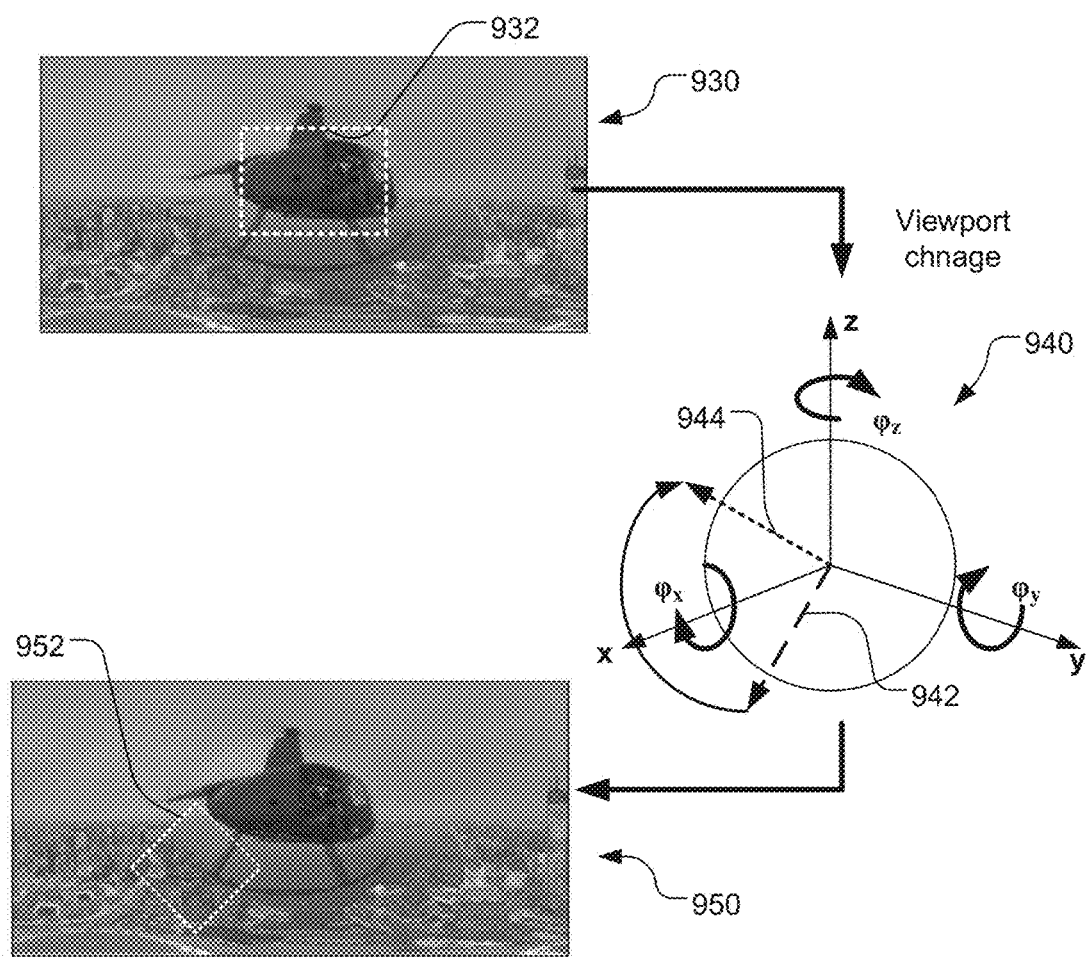
Figure 9C:
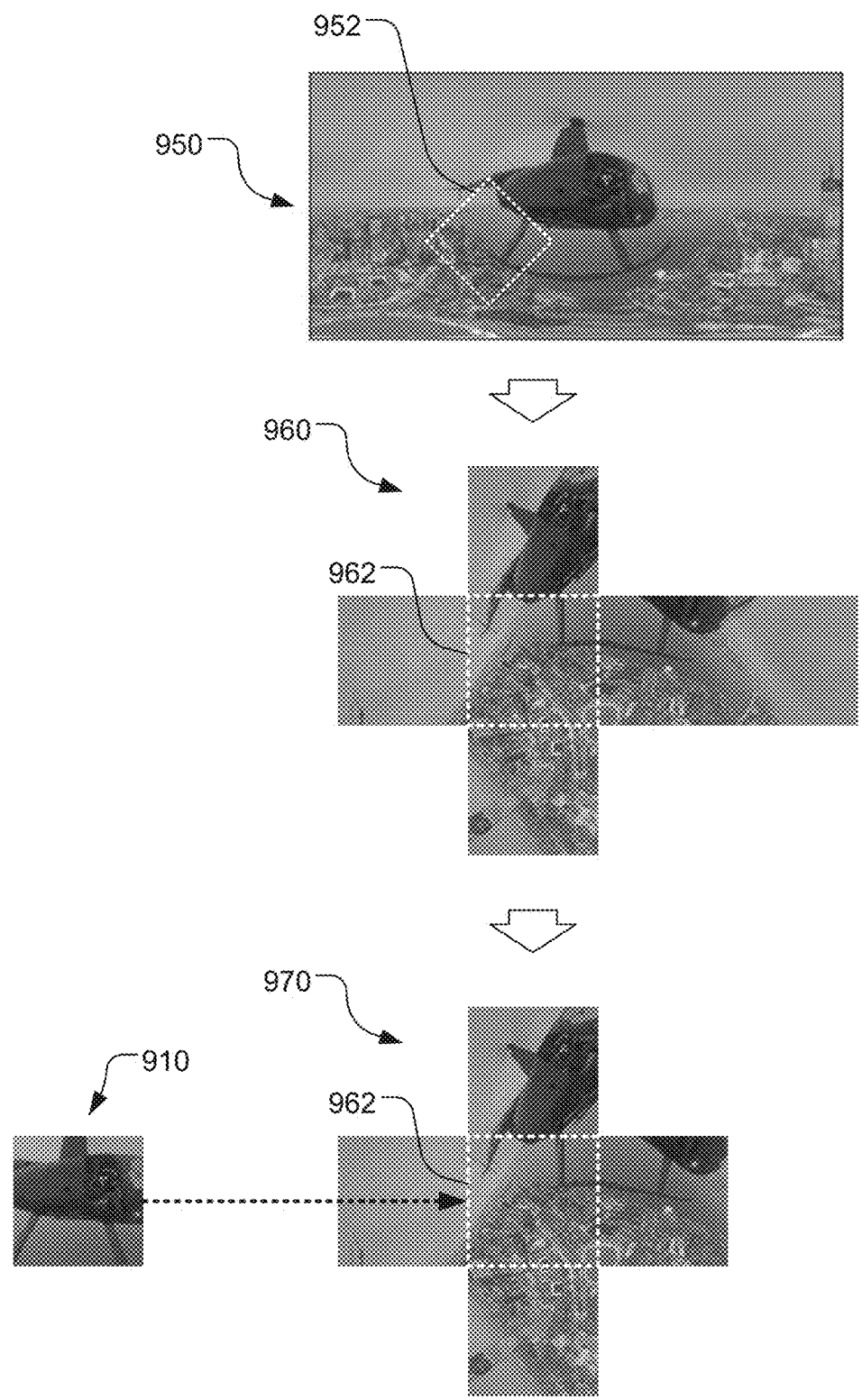

FIGS. 9A-C illustrate an example of arbitrary-viewport virtual reference construction for a cubic face via the equirectangular domain. In FIG. 9A, the target face 910 of a cube is shown in the center 922 of an original virtual reference frame 920. The original virtual reference frame 920 is transformed from cubic mapping to equirectangular representation 930 with the target face 932. shown in the original viewport. FIG. 9B illustrates an example of viewport change in the equirectangular domain by rotating the x-axis (i.e., $\phi_x$) of the equirectangular. The original viewport corresponds to the offset 942 in the x-axis. The viewport is changed to the offset 944 in the x-axis. This new offset 944 in the x-axis corresponds to image area 952. Accordingly, the new viewport 952 is determined in the equirectangular reference frame 950. FIG. 9C illustrates an example to transform the new viewport in the equirectangular reference frame back to cubic mapping. After the transform, new viewport 952 in the equirectangular reference frame 950 is mapped to a center face 962 of a cubic net 960. The center face 962 with four adjacent faces connected is shown in the constructed arbitrary-viewport reference frame 970 with the original target face 910 shown.

After adjacent faces are connected to the target face, some regions may still have no data. In FIG. 6 and FIG. 7, examples of non-existing-face regions for the cubic mapping and the icosahedron mapping. The present invention also discloses techniques for padding non-existing-face regions in the virtual reference frame. For example, if an existing adjacent face can be placed without ambiguity, the corresponding adjacent face for the existing adjacent face can be connected for the region outside the boundary. For regions that have no corresponding face existing, padding data can be derived from other faces.

Figure 10A:
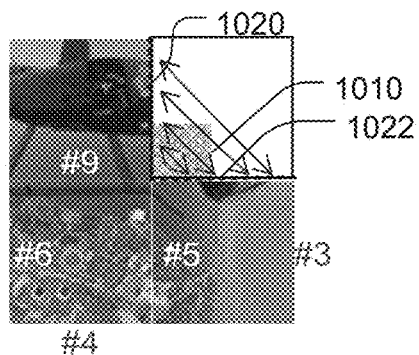
FIG. 10A illustrates an example of padding an upper-right unfilled corner using line-based padding, where each line is assigned a value from a single pixel (e.g. a boundary pixel).
Figure 10B:
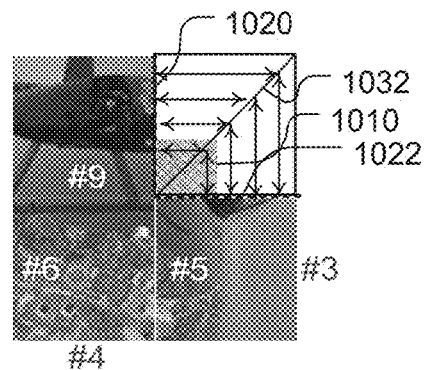
FIG. 10B illustrates an example of padding an upper-right unfilled corner using line-based padding, where each vertical line is assigned one value from one pixel and each horizontal line is assigned another value from another pixel.

Various techniques to generate the padded data for the four unfilled corners of the padding area are disclosed. According to one embodiment, line-based padding is used by assigning a same value along each line. For example, the line can be obtained from the boundary of current face or from the boundary of the neighboring face as shown in FIG. 10A for the padding of upper-right corner area 1010. The lines are shown as arrowed lines connecting the two neighboring cubic edges. The pixel value can be copied along the arrowed line from the pixels at the vertical boundary 1020 or from the horizontal boundary 1022. The line can be assigned a value from a single pixel or multiple pixels. For example, FIG. 10B illustrates an example of using two pixels for each line, where the line goes in the horizontal direction in the upper region of the diagonal line 1032 and goes in the vertical direction in the lower region of the diagonal line 1032. For the horizontal direction, the line copies pixel from the vertical boundary 1020 and for the vertical direction, the line copies pixels from the horizontal boundary 1022.

Figure 10C:
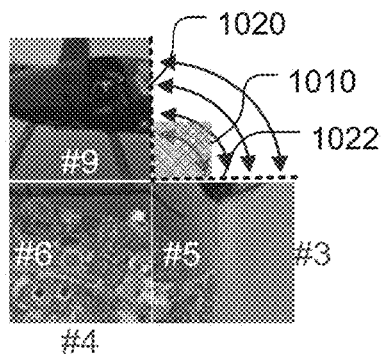
FIG. 10C illustrates an example of padding an upper-right unfilled corner using circular-based padding, where each circular line is assigned a value from a single pixel or a weighted sum of two pixels from two boundaries.
Figure 10D:
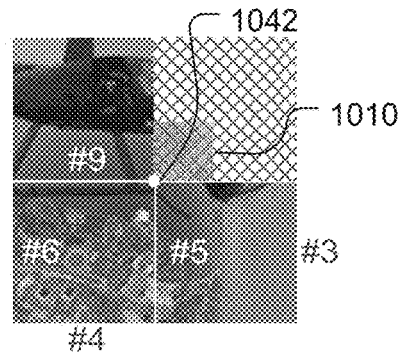
FIG. 10D illustrates an example of padding an upper-right unfilled corner using point-based padding, where the corner pixel is extended to the unfilled corner area.

In another embodiment, circular-based padding is used by assigning a same value along each circular line as shown in FIG. 10C. The value can be derived from one of the boundary (i.e., 1020 or 1022) or a weighted sum of two pixels from two boundaries (i.e., 1020 and 1022). In yet another embodiment, point-based padding is used to generate padded data by extending the corner pixel 1042 to the unfilled corner area as shown in FIG. 10D. In this case, the pixel value for pixels in the padding area is the same as the corner pixel 1042.

As mentioned before, the sequence for each face can be coded individually. Alternatively, all the faces with the same time index can be combined into a frame and the frame sequence is coded. For the coding system that the face sequences of the same polyhedral mapping are separately coded, each face is coded individually without using prediction from other faces. The video bitstream of all faces of the same frame may be packed together. If the input VR source is arranged in a frame format according to a layout scheme, the faces can be extracted out of the frame and then coded as individual face sequences.

As mentioned before, the faces associated with a same frame for a polyhedron are interconnected with neighboring faces at commonly shared face boundaries. In order to improve coding efficiency for individual face sequence coding, the present invention discloses Inter prediction using virtual reference frames. The method comprises constructing N sets of virtual reference frames, where each set of virtual reference frames is used by its corresponding face and N corresponds to the number of faces of the polyhedron. For each face sequence, the method selects a set of virtual reference frame(s) for Inter prediction and encodes the face sequence using a video encoder.

Figure 11A:
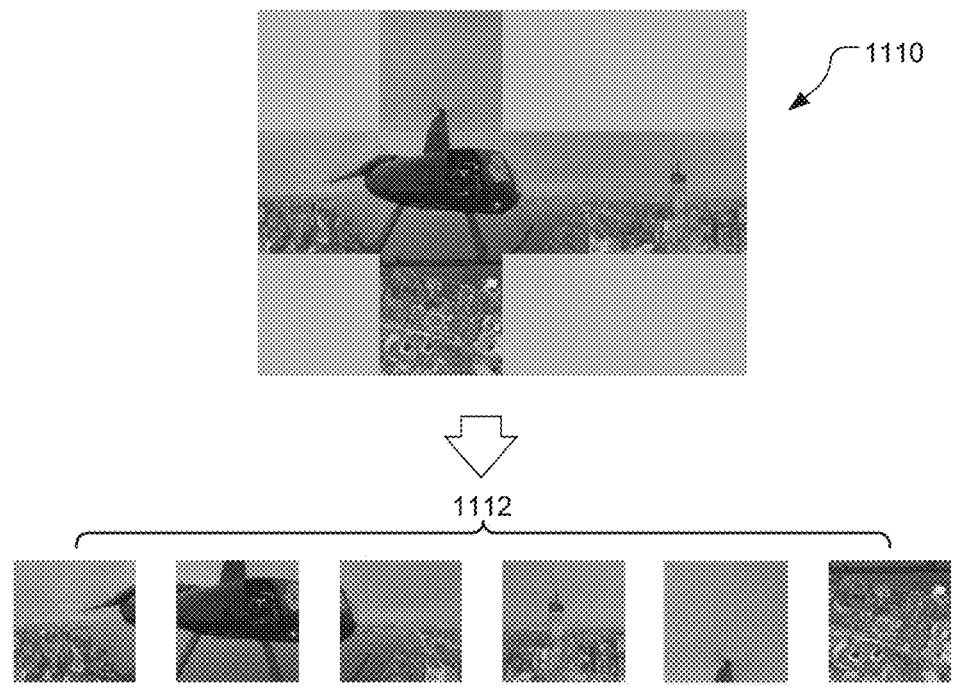
FIG. 11A illustrates an example of separating a cubic frame into individual faces, where the individual faces are extracted from a cubic net.
Figure 11B:
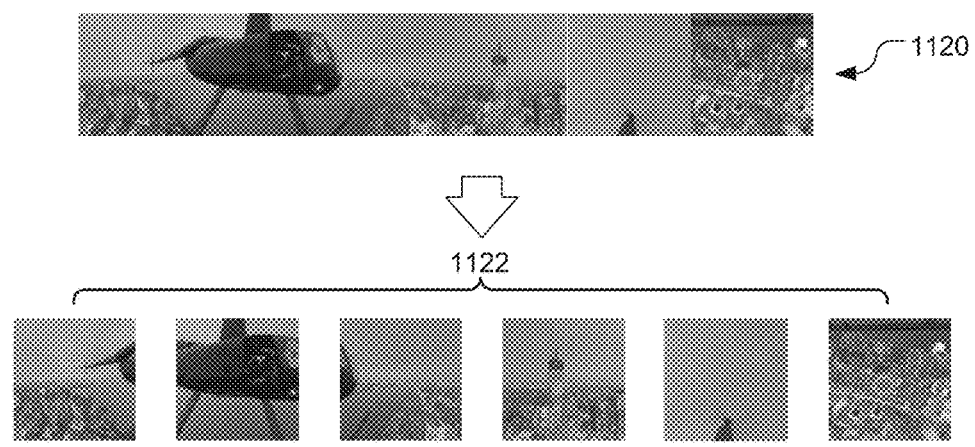
FIG. 11B illustrates an example of separating a cubic frame into individual faces, where the individual faces are extracted from a 6×1 assembled cubic frame.
Figure 11C:
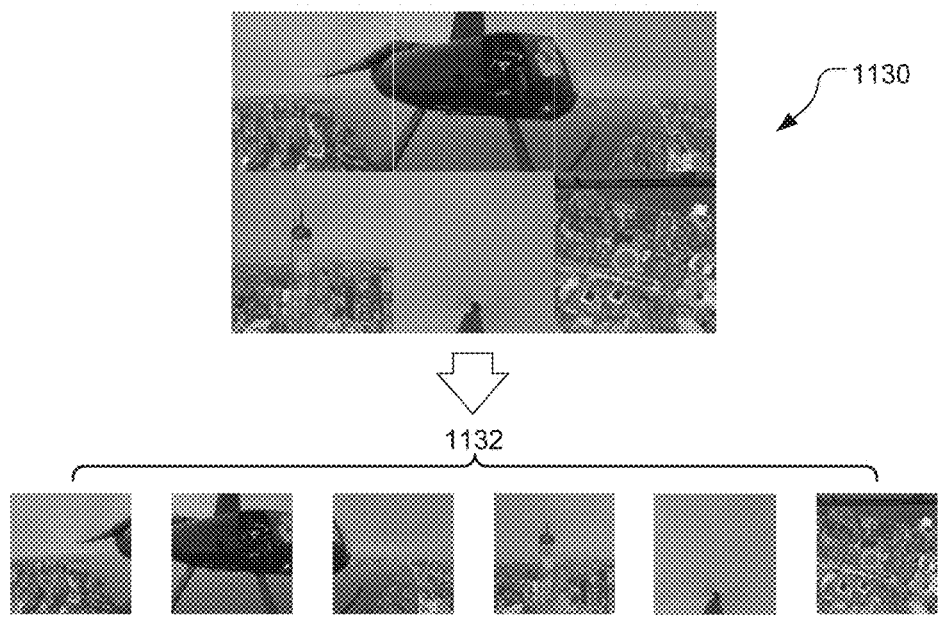
FIG. 11C illustrates an example of separating a cubic frame into individual faces, where the individual faces are extracted from a 3×2 assembled cubic frame.

FIGS. 11A to 11C illustrate examples of separating a cubic frame into individual faces, in FIG. 11A, individual faces 1112 are extracted from a cubic net 1110. In FIG. 11B, individual faces 1122 are extracted from a 6×1 assembled cubic frame 1120. In FIG. 11C, individual faces 1132 are extracted from a 3×2 assembled cubic frame 1130. The face sequences are then coded individually.

Figure 12A:
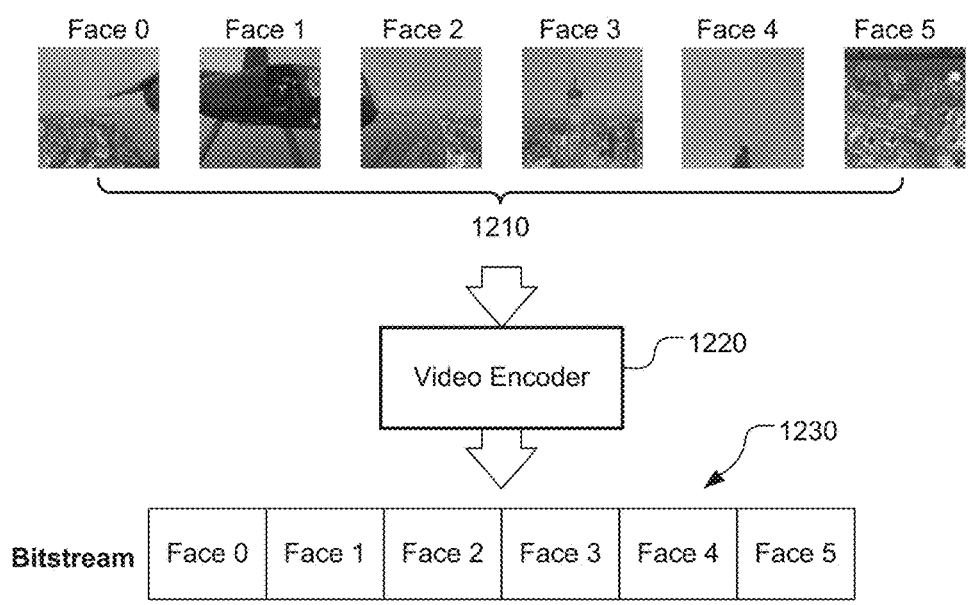
FIG. 12A illustrates an exemplary structure for coding face sequences individually.
Figure 12B:
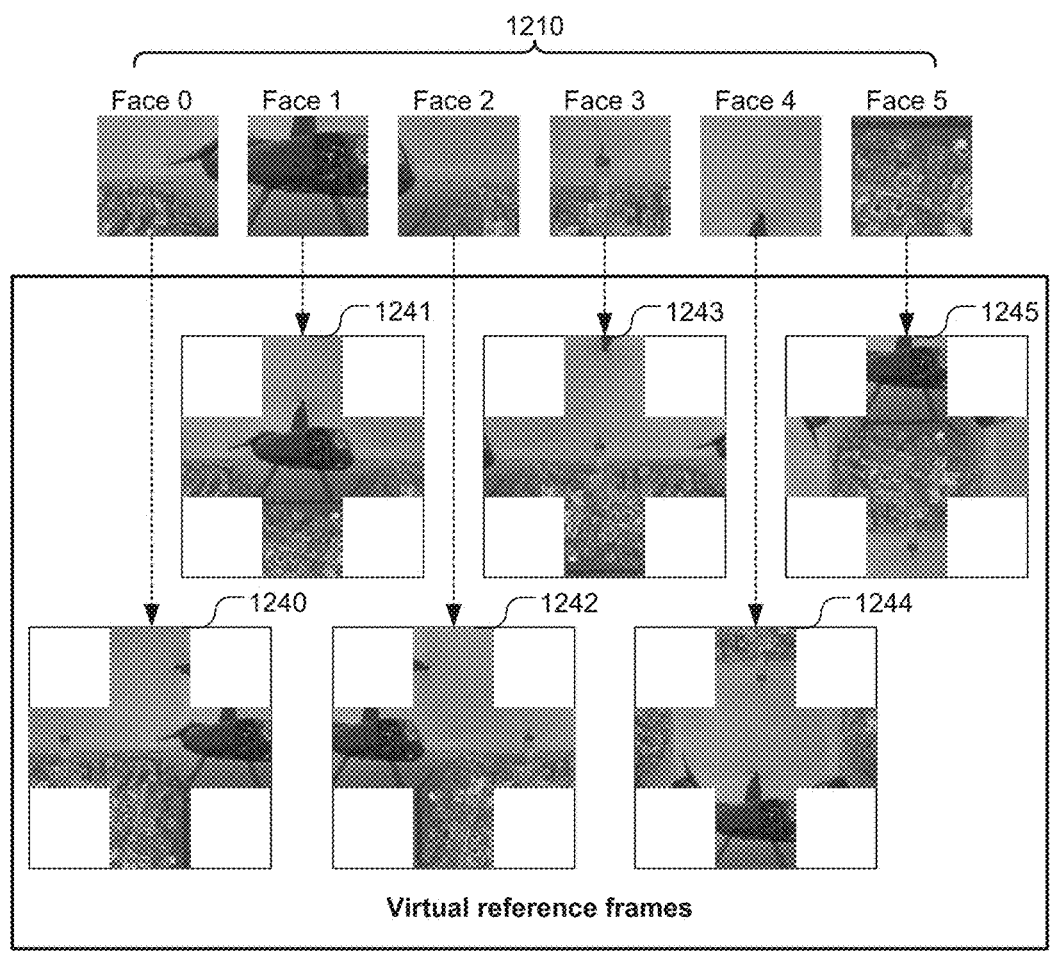
FIG. 12B illustrates the virtual reference frames for individual faces respectively.

FIG. 12A illustrates an exemplary structure for coding face sequences individually. In this example, the face sequences 1210 are provided to Video Encoder 1220. Bitstream 1230 is generated from the Video Encoder 1220, where compressed data for all faces in a same frame are packed together. When Inter prediction is applied to each face sequence, the corresponding set of virtual reference frames can be used according to the present invention. FIG. 12B illustrates the virtual reference frames (1240-1245) for individual faces 0 to 5 respectively. The method to construct the virtual reference frames has been disclosed earlier.

In the examples shown in FIGS. 11A-C and FIGS. 12A-B, the faces from a cube are all rectangular. However, when coding an unfolded polyhedral mapping, the faces may not be always rectangular. For example, unfolding an icosahedron will result in 20 faces in the triangular shape. However, video coding systems are often designed to handle rectangular images. In order to handle the non-rectangular faces, various methods are discloses according to embodiments of the present invention. For example, a smallest rectangle to enclose the face and to be divisible into an integer number of MBs (macroblocks) or CUs (coding units) is generated by filling pixels outside the triangular face with blank data or padding data. The padded face is then encoded according to the MB (macroblock) or CU (coding unit) scanning order. If an MB/CU does not cover any part of the face (i.e., pure padding data), this MB/CU is treated as Skip mode. If an MB/CU covers any part of the face, this MB/CU is encoded. After reconstruction, all pixels outside the face are set to zero or disregarded (i.e., not used).

Figure 13A:
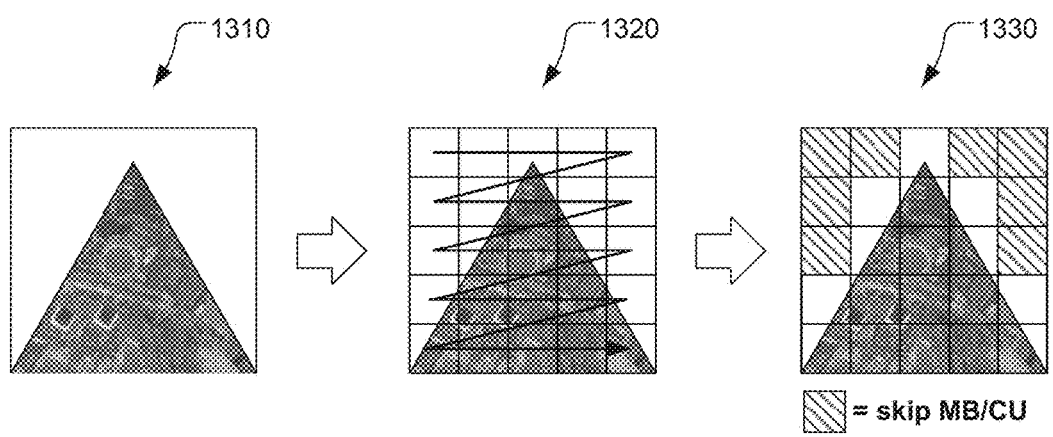
FIG. 13A illustrates an example of encoding process for a non-rectangular face according to an embodiment of the present invention.

FIG. 13A illustrates an example of encoding process for a non-rectangular face according to an embodiment of the present invention. Image 1310 corresponds to a smallest rectangular image that encloses the triangular face and is divisible into an integer number of MBs or CUs for subsequent coding process. Image 1320 illustrates the padded rectangular image being divided into MBs/CUs and the MBs/CUs are coded according to the scanning order as indicated by the raster lines. During the encoding process, these MBs/CUs fully outside the triangular face are coded in the Skip mode as shown in image 1330.

Figure 13B:
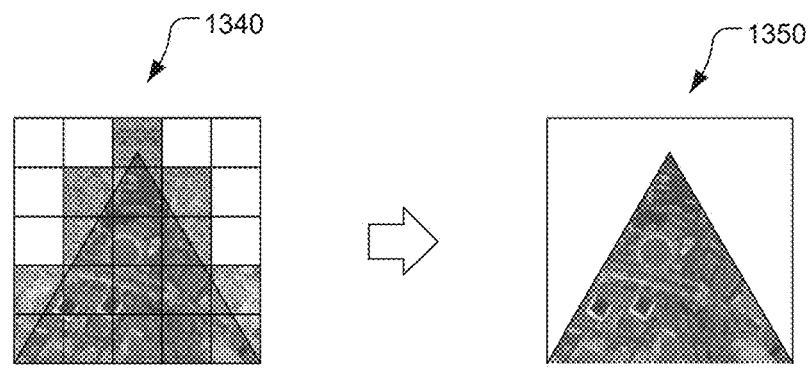
FIG. 13B illustrates an example of decoding process for a non-rectangular face according to an embodiment of the present invention.

FIG. 13B illustrates an example of decoding process for a non-rectangular face according to an embodiment of the present invention. Image 1340 represents the image after initial decoding process. The decoded data outside the triangular face are not part of the true face data. Accordingly, all data outside the triangular face are set to zero as shown in image 1350.

The present invention also discloses a coding system for video by combining all the faces with the same time index into a frame and then encoding the frame sequence. Each source frames is composed of all the faces arranged in a selected layout scheme, The source frames are then provided to an encoder as input and the encoder encodes MBs/CUs according to a scanning order. The scanning order can be defined according to a standard. For each MB/CU, the block may utilize its own virtual reference frame for Inter prediction.

Figure 14:
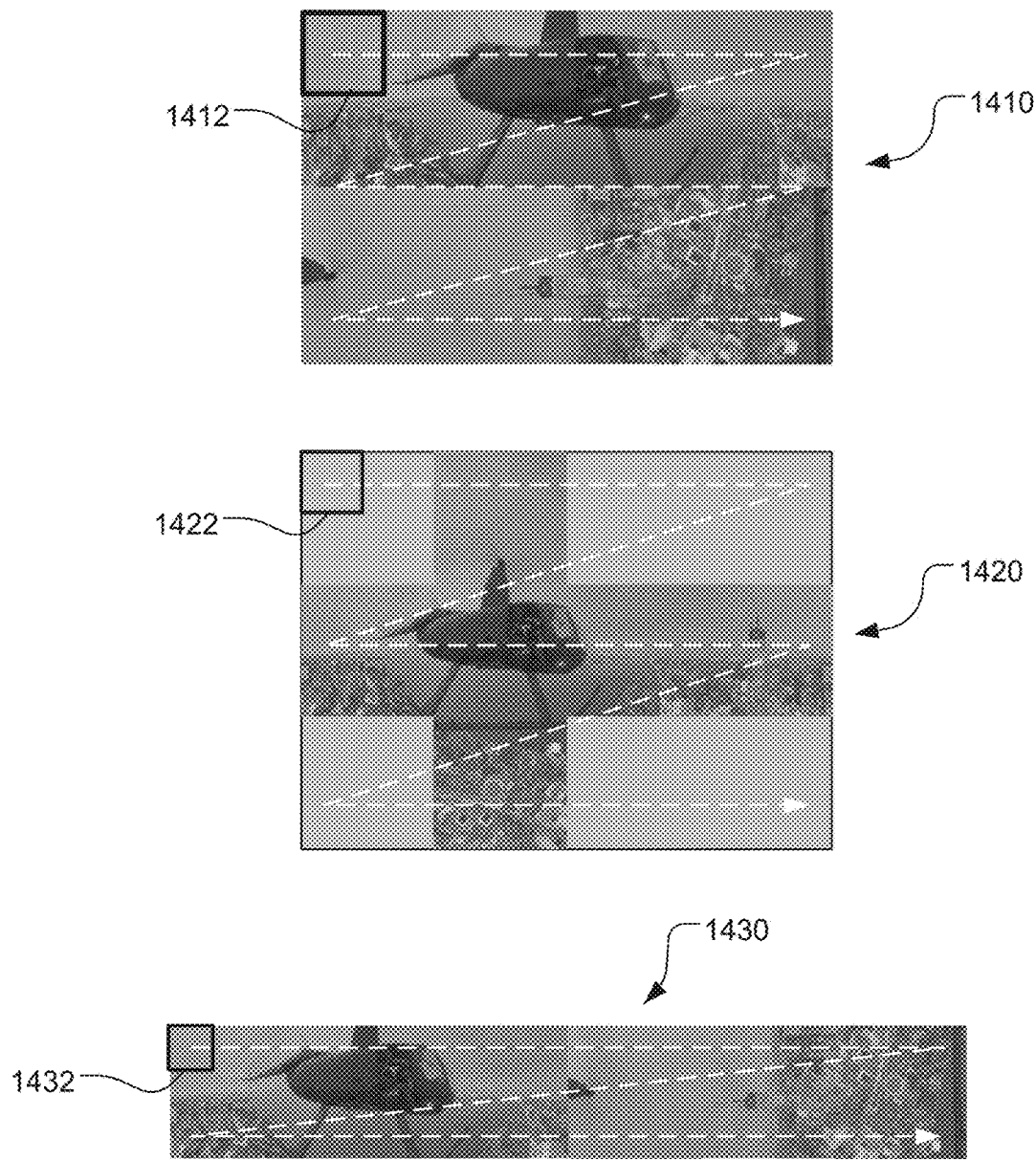
FIG. 14 illustrates some examples of frame sequence coding for different cubic mapping layouts (a 3×2 assembled cubic frame, an unfolded cubic net and a 6×1 assembled cubic frame).

As mentioned before, the source frame can be arranged in various layout formats. According to embodiments of the present invention, the multi-face frame is partitioned into MBs/CUs and the MBs/CUs are coded according to the scan order. Reference frame of a target MB/CU depends on the face that the MB/CU belongs to. FIG. 14 illustrates some examples of frame sequence coding for different cubic mapping layouts. Image 1410 corresponds to an assembled 3×2 cubic frame and the frame is partitioned into MBs/CUs. The MBs/CUs are encoded according to a scanning order as indicated by the dashed lines and the starting MB/CU 1412 is indicated. Image 1420 corresponds to a cubic net with blank areas and the starting MB/CU 1422 is indicated. Image 1430 corresponds to an assembled 6×1 cubic frame and the starting MB/CU 1432 is indicated.

Figure 15:
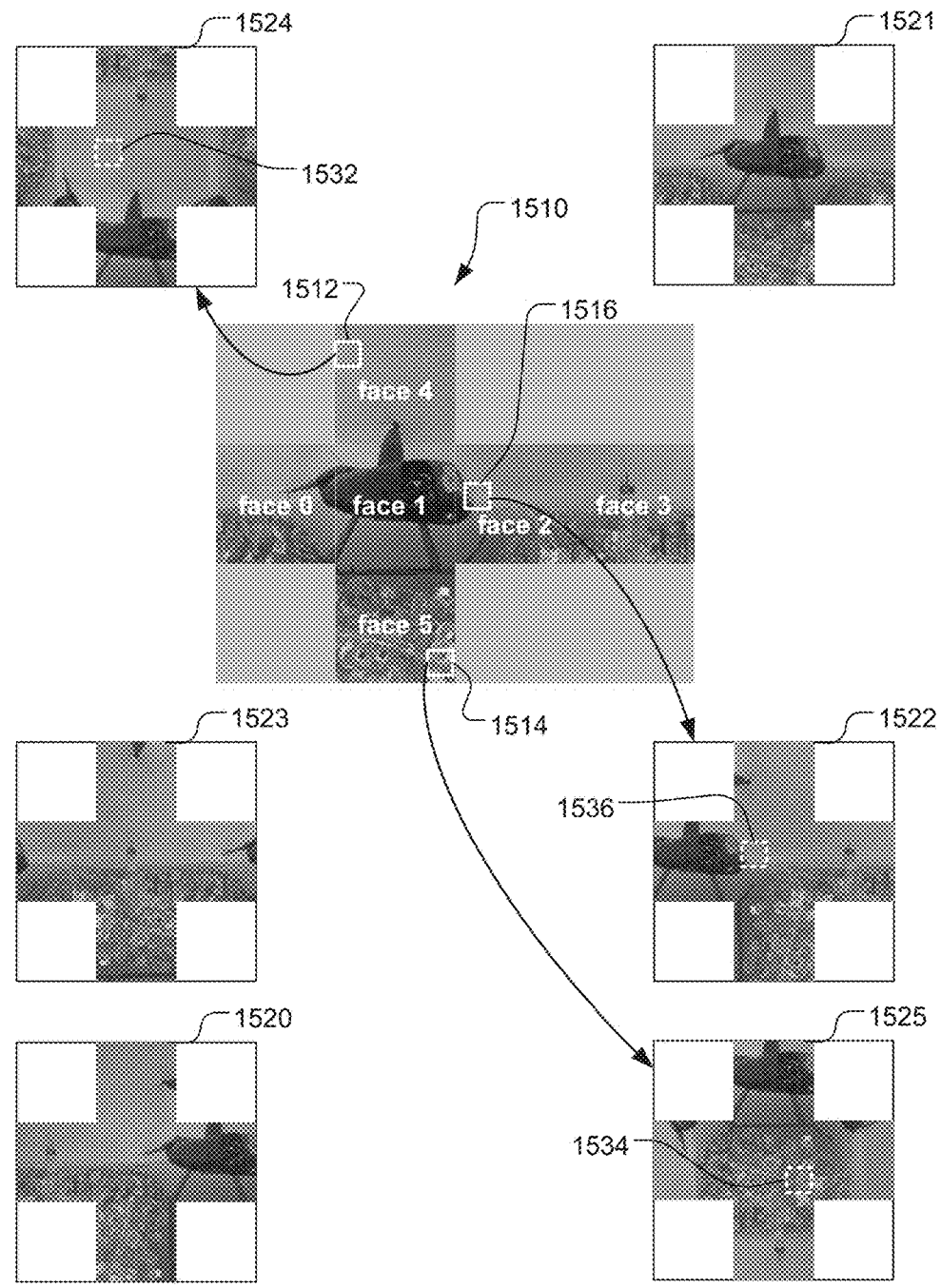
FIG. 15 illustrates an example of determining virtual reference frames for difference faces in the case of a frame sequence corresponding to a cubic net.

FIG. 15 illustrates an example of determining virtual reference frames for difference faces in the case of a frame sequence corresponding to a cubic net. Image 1510 corresponds to a cubic net frame with the face numbers labelled. Blocks 1512, 1514 and 1516 correspond to three blocks in the cubic net frame to be coded. As mentioned before, a virtual reference frame (i.e., 1520, 1521, 1522, 1523, 1524 or 1525) can be constructed for each face, When a block is coded, a virtual reference frame can be selected depending on the face that the block is located. For example, if block 1512 in face 4 is coded, virtual reference frame 1524 is selected for Inter prediction of block 1512. A collocated block 1532 corresponding to block 1512 can be identified in the center face of virtual reference frame 1524. Similarly, if block 1514 in face 5 is coded, virtual reference frame 1525 is selected for Inter prediction of block 1514, A collocated block 1534 corresponding to block 1514 can be identified in the center face of virtual reference frame 1525. When block 1516 in face 2 is coded, virtual reference frame 1522 is selected for Inter prediction of block 1516. A collocated block 1536 corresponding to block 1516 can be identified in the center face of virtual reference frame 1522.

Figure 16:
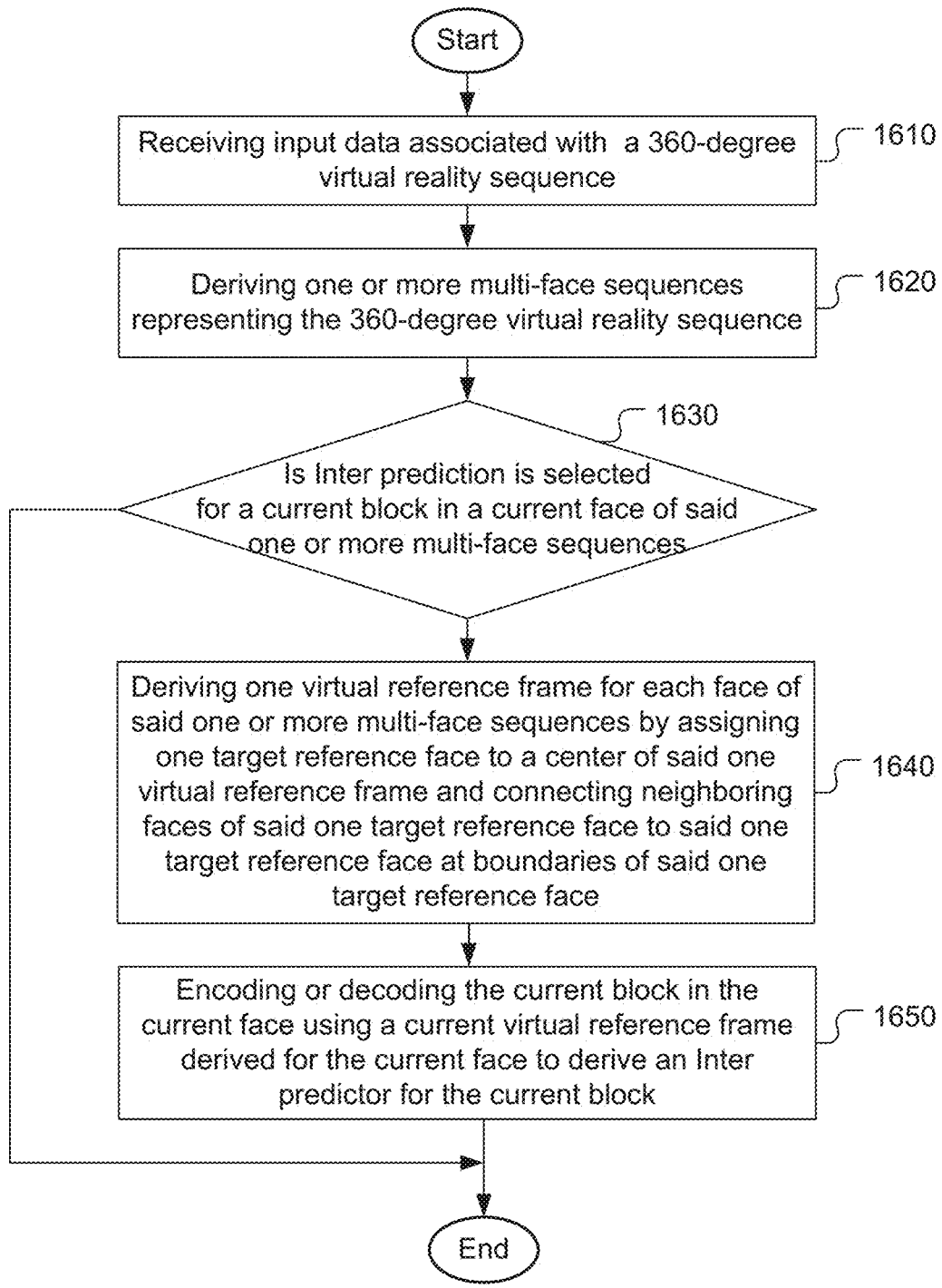
FIG. 16 illustrates an exemplary flowchart for a video encoding or decoding system applied to a 360-degree virtual reality sequence according to the present invention, where sets of virtual reference frames are constructed and used for Inter coding of multi-face frame sequence.

FIG. 16 illustrates an exemplary flowchart for a video encoding or decoding system applied to a 360-degree virtual reality sequence according to the present invention, where sets of virtual reference frames are constructed and used for Inter coding of multi-face frame sequence. According to this method, input data associated with a 360-degree virtual reality sequence are received in step 1610. In the encoder side, the input data correspond to pixel data of the multi-face sequences to be encoded. At the decoder side, the input data correspond to a video bitstream or coded data that are to be decoded. One or more multi-face sequences representing the 360-degree virtual reality sequence are derived in step 1620. Whether Inter prediction is selected for a current block in a current face of said one or more multi-face sequences is checked in step 1630. If Inter prediction is selected for a current block (i.e., the "Yes" path from step 1630), steps 1640 and 1650 are performed. Otherwise (i.e., the "No" path from step 1630), steps 1640 and 1650 are skipped. In step 1640, one virtual reference frame is derived for each face of said one or more multi-face sequences by assigning one target reference face to a center of said one virtual reference frame and connecting neighboring faces of said one target reference face to said one target reference face at boundaries of said one target reference face. In step 1650, the current block is encoded or decoded in the current face using a current virtual reference frame derived for the current face to derive an Inter predictor for the current block.

The above flowcharts may correspond to software program codes to be executed on a computer, a mobile device, a digital signal processor or a programmable device for the disclosed invention. The program codes may be written in various programming languages such as C++. The flowchart may also correspond to hardware based implementation, where one or more electronic circuits (e.g. ASIC (application specific integrated circuits) and FPGA (field programmable gate array)) or processors (e.g. DSP (digital signal processor)).

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for video encoding or decoding for a video encoding or decoding system applied to a 360-degree virtual reality sequence, the method comprising:
receiving input data associated with the 360-degree virtual reality sequence;
deriving one or more multi-face sequences representing the 360-degree virtual reality sequence;
if Inter prediction is selected for a current block in a current face of said one or more multi-face sequences:
deriving one virtual reference frame for each face of said one or more multi-face sequences by assigning one target reference face to a center of said one virtual reference frame and connecting neighboring faces of said one target reference face to said one target reference face at boundaries of said one target reference face; and
encoding or decoding the current block in the current face using a current virtual reference frame derived for the current face to derive an Inter predictor for the current block.

2. The method of claim 1, wherein said one or more multi-face sequences correspond to N individual face sequences and each face sequence is individually encoded or decoded, and wherein N is an integer corresponding to a total number of faces in a polyhedron representing the 360-degree virtual reality sequence.

3. The method of claim 1, herein said one or more multi-face sequences correspond to one frame sequence, and wherein each frame comprises all faces of a polyhedron having a same time index.

4. The method of claim 1, wherein said one target reference face assigned to the center of said one virtual reference frame for the current face corresponds to one reference face having a same face number as the current face without any rotation.

5. The method of claim 1, wherein said one target reference face assigned to the center of said one virtual reference frame for the current face corresponds to one reference face having a different face number from the current face.

6. The method of claim 5, wherein said one reference face having the different face number from the current face is rotated by an angle.

7. The method of claim 6, wherein face identification information associated with said one reference face, angle information associated with the angle rotated, or both are signaled at an encoder side or parsed at a decoder side.

8. The method of claim 1, wherein said one target reference face assigned to the center of said one virtual reference frame for the current face corresponds to one arbitrary-viewport reference face derived by rotating one original target reference face from an original viewport in one or more of three orthogonal axes of an associated equirectangular.

9. The method of claim 8, wherein said one original target reference face at a center of an original virtual reference frame is transformed to a corresponding reference face picture in the associated equirectangular; the corresponding reference face picture is changed to a new corresponding reference face picture with a new viewport by rotating from the original viewport in said one or more of three orthogonal axes of the associated equirectangular; the new corresponding reference face picture in the associated equirectangular is transformed to a new target reference face in a multi-face frame; and the new target reference face is used as said one target reference face.

10. The method of claim 8, wherein rotation information related to said rotating said one original target reference face from the original viewport in said one or more of three orthogonal axes of the associated equirectangular is signaled in a video bitstream at an encoder side or parsed from the video bitstream at a decoder side.

11. The method of claim 8, wherein rotation information related to said rotating said one original target reference face from the original viewport in said one or more of three orthogonal axes of the associated equirectangular is derived at an encoder side from one or more MVs (motion vectors) of the current block or one or more previously-coded temporal or spatial neighboring blocks, and wherein no rotation information is signaled explicitly in a video bitstream.

12. The method of claim 11, wherein the rotation information related to said rotating said one original target reference face from the original viewport in said one or more of three orthogonal axes of the associated equirectangular is derived at a decoder side from said one or more MVs of the current block or one or more previously-coded temporal or spatial neighboring blocks.

13. The method of claim 1, further comprising padding one or more empty regions if said one virtual reference frame contains any empty region after assigning said one target reference face to the center of said one virtual reference frame and connecting neighboring faces of said one target reference face to said one target reference face at boundaries of said one target reference face.

14. The method of claim 13, wherein if one target empty region is outside one face boundary and an existing adjacent face is able to be placed into said target empty region without ambiguity, said one target empty region is padded using the existing adjacent face.

15. The method of claim 13, wherein if one target empty region has no corresponding adjacent face, said one target empty region is padded using padding data derived from other faces.

16. The method of claim 1, wherein if the current face is non-rectangular, a smallest rectangular enclosing the current face is used for encoding or decoding the current face, and wherein the smallest rectangular is adjusted to be divisible into an integer number of processing blocks for encoding or decoding.

17. The method of claim 16, wherein if a target processing block contains no pixels belonging to the current face, the target processing block is coded as a Skip mode.

18. The method of claim 16, wherein at a decoder side, all pixels outside the current face are set to zero or disregarded.

19. An apparatus for video encoding or decoding for a video encoding or decoding system applied to a 360-degree virtual reality sequence, the apparatus comprising one or more electronics or processors arranged to:
receive input data associated with the 360-degree virtual reality sequence;
derive one or more multi-face sequences representing the 360-degree virtual reality sequence;
if Inter prediction is selected for a current block in a current face of said one or more multi-face sequences:
derive one virtual reference frame for each face of said one or more multi-face sequences by assigning one target reference face to a center of said one virtual reference frame and connecting neighboring faces of said one target reference face to said one target reference face at boundaries of said one target reference face; and encode or decode the current block in the current face using a current virtual reference frame derived for the current face to derive an Inter predictor for the current block.

* * * * *